United States Patent [19]
Bremer

[11] 3,733,905
[45] May 22, 1973

[54] CHEMICAL THERMOMETER AND HOLDER

[76] Inventor: Norman C. Bremer, 608 East Seneca Street, Ithaca, N.Y. 14850

[22] Filed: Sept. 2, 1971

[21] Appl. No.: 177,396

[52] U.S. Cl. .................73/356, 73/340, 73/358
[51] Int. Cl. ...................G01k 11/12, G01k 1/14
[58] Field of Search.................73/340, 356, 358

[56] References Cited

UNITED STATES PATENTS

| | | | |
|---|---|---|---|
| 2,870,636 | 1/1959 | Serafin | 73/371 |
| 3,175,401 | 3/1965 | Geldmacher | 73/358 |
| 3,430,491 | 3/1969 | Gignilliat | 73/356 X |
| 3,580,079 | 5/1971 | Crites | 73/358 |

Primary Examiner—Richard C. Queisser
Assistant Examiner—Frederick Shoon
Attorney—Samuel J. Stoll et al.

[57] ABSTRACT

A thermometer incorporating on a flexible and disposable substrate a plurality of spaced temperature-sensitive chemicals which are calibrated to indicate a temperature in the clinical range. The substrate is secured by a holder having a bifurcated mouthpiece and a handle extending from the mouthpiece. The bifurcated mouthpiece is generally V- or U-shaped so as to fit beneath a patient's tongue while carrying the substrate. The temperature-sensing chemicals on the substrate are activated and the holder and substrate are withdrawn for temperature reading. The substrate is disposed and a new one placed in the holder. It is a feature of the invention that there be a minimum surface area contact between the holder and the substrate to minimize heat exchange between them.

6 Claims, 7 Drawing Figures

PATENTED MAY 22 1973 3,733,905
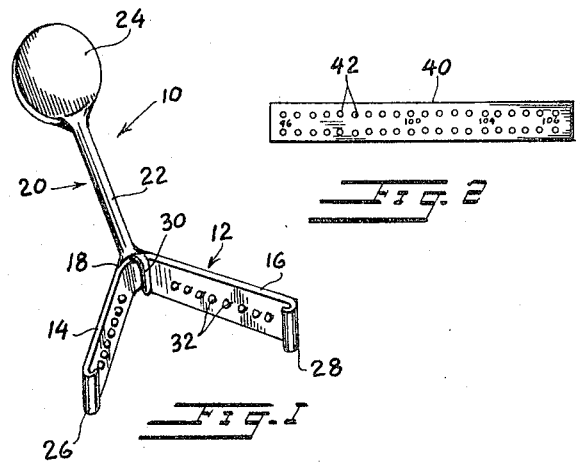
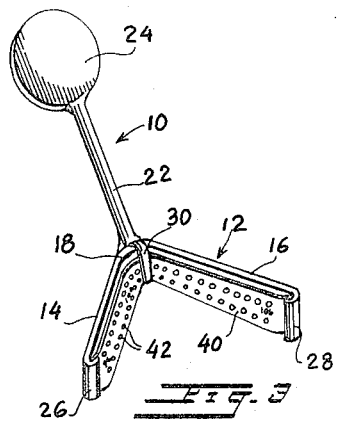
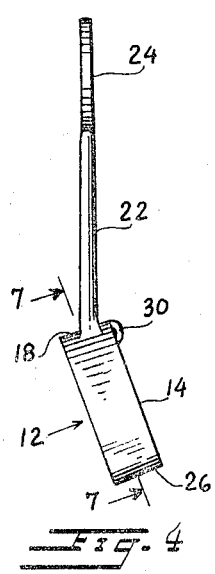
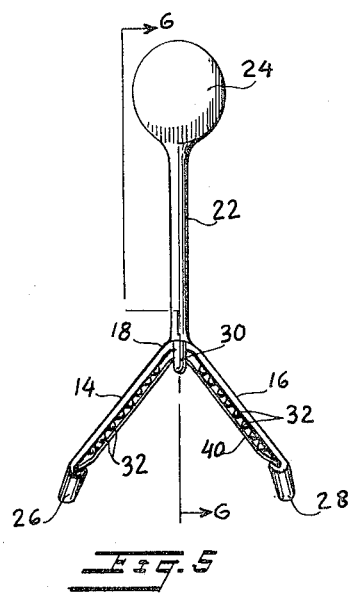
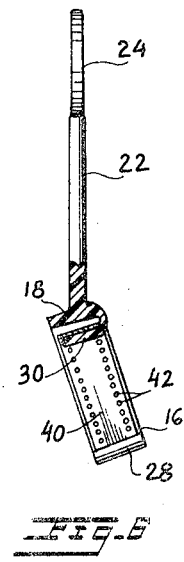
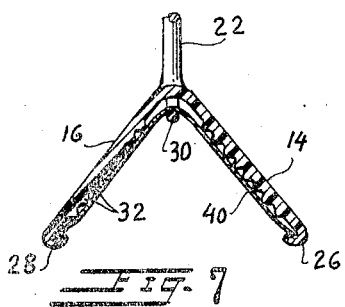
INVENTOR.
NORMAN C. BREMER
BY Stolf and Stolf
ATTORNEYS

CHEMICAL THERMOMETER AND HOLDER

REFERENCE TO RELATED APPLICATION

This application is related to my co-pending Patent application Ser. No. 120,825, filed Mar. 4, 1971 and entitled BIFURCATED THERMOMETER PROBE.

SUMMARY OF THE INVENTION

The economic realities of modern medical practice require that simple and repetitive tasks, however important, be performed quickly and accurately, perhaps by unskilled personnel. Temperature measurements of patients in a large hospital may be made hundreds or thousands of times a day. Clearly, the common system of using breakable and hard to read glass-mercury thermometers which must be sterilized after each use is subject to great improvement.

The present invention makes use of recently developed temperature-sensitive chemicals which upon reaching an ascertained temperature react virtually immediately by a change in a clearly visible property such as color. Other such chemicals react by liquefying at a pre-determined temperature. By placing a sequence of such chemicals on a flexible substrate, the sequence being temperature-sensitive at desired intervals through a desired temperature range, it is possible to provide a visible and permanent record of the temperature of the subject under test which is clearly and accurately read by unskilled personnel. In the case of clinical temperature measurement the desirable range is between 96°F and 106° F at intervals of 1/10°F. This, of course, is the range normally associated with the human body as measured at points which are generally considered to provide accurate representations thereof, e.g., the oral or rectal cavities.

The present invention provides a temperature-measuring instrument which is capable of performing within the range and at the intervals necessary for clinical use while providing ease, accuracy, economy and comfort in use together with sterility and permanence of the measured temperature.

The present invention provides a series of temperature-sensitive chemicals which change in visible property upon attaining a design temperature. Thus, for example, a series of 100 chemical formulations can provide temperature measurements at 1/10° intervals over a range of 10°, each formulation being adapted to change in visible property upon attaining one of the 100 temperature intervals. When serially arranged on a substrate a scale may be provided to give visual indication of the temperature scale employed. The substrate is exposed for temperature measurement once and will thereafter retain the indicated measurement unless subsequently subjected to a higher temperature.

The present invention provides a holder for the substrate which is intended for clinical use and is adapted to be placed in the oral cavity of a patient adjacent the fraenum of the tongue. It is known to the medical profession that the most accurate measurement of body temperature by oral means is a measurement taken on the sides of the fraenum of the tongue and accordingly the holder is adapted to position the substrate in intimate contact with the underside of the tongue on the sides of the fraenum. The holder positions the substrate in a substantially V or U shape, covers possible sharp edges of the substrate and allows for rapid removal of used substrates and insertion of fresh substrates. To accomplish these functions, the holder has a bifurcated mouthpiece with arms which extend outwardly from each other in a substantially V configuration and which join at a rounded apex. Each end of the mouthpiece has a retaining member which may be a groove and the interior of the apex is provided with a hook. The substrate, which is relatively flexible, is placed in the mouthpiece by sliding the ends into the mouthpiece grooves and the center into the apex hook. The substrate then conforms to the configuration of the bifurcated mouthpiece and may be inserted into the oral cavity by means of a handle extending from the outside of the apex. In order to insure against substantial heat transfer or loss from the substrate to the holder, provision is made to reduce the surface area contact between the substrate and the mouthpiece.

BRIEF DESCRIPTION OF THE DRAWING

FIG. 1 is a perspective view of the holder of the present invention showing the bifurcated mouthpiece and the hook and groove system for retaining the substrate.

FIG. 2 is a plan view of a substrate embodying dots of thermally-sensitive chemical in scaled position from 96°F to 106°F.

FIG. 3 is a view similar to that of FIG. 1 but showing the substrate of FIG. 2 mounted on the holder.

FIG. 4 is a side view of the holder of the present invention.

FIG. 5 is a front view of the holder of the present invention showing the substrate mounted thereon.

FIG. 6 is a partial cross-sectional view taken across line 6—6 of FIG. 5.

FIG. 7 is a fragmentary view taken across line 7—7 of FIG. 4.

DESCRIPTION OF THE PREFERRED EMBODIMENT OF THE INVENTION

The preferred embodiment as will be described provides a semi-disposable holder for a disposable temperature-sensitive indicating plate. The notion of disposability is primarily an economic matter in which the cost of the disposing of an element must be compared with the cost of retaining that element for repeated use. The holder of the invention may be molded from a very inexpensive plastic resin with thin wall members to bring the cost down to a minimum and make disposability after a single use economically practical. Conversely, the holder may be manufactured from durable material capable of withstanding repeated autoclaving which in large scale operations may be less expensive than single use holders, particularly in hospitals which already have investments in autoclaves for glass-mercury thermometer sterilization. The preferred embodiment takes a middle of the road approach in which the holder is adapted to be repeatedly used by one patient and then disposed and not used for any other patient.

Referring to the drawing, the holder 10 of the present invention is provided with the bifurcated mouthpiece 12 having a pair of arms 14 and 16 joining in a V shape at apex 18. The apex may be sufficiently rounded to provide a U shape rather than a V shape. Extending from the exterior of the apex and preferably formed integrally with the mouthpiece is a handle 20 including a stem 22 and a grip 24.

The outer ends of arms 14 and 16 opposite apex 18 are provided with grooved flanges 26 and 28 respectively formed within the V shape of the mouthpiece and opening toward apex 18. The apex is provided with a hook 30, and the entire bifurcated mouthpiece 12 is adapted to receive a thin flexible strip extending from grooved flange 26 under hook 30 to grooved flange 28. The strip so secured conforms substantially to the configuration of the mouthpiece and may be removed simply by sliding it in the direction from whence it came, namely, in the direction of the opening of hook 30.

The temperature-indicating portion of the invention is a substrate 40 bearing a series of chemicals which visibly react to particular temperatures. Such chemicals are known in the chemical trade as surface temperature indicators and they react upon attaining a particular design temperature by an immediate change in a visible characteristic. The more popular and better known chemicals melt from a solid to a liquid upon reaching a particular temperature. Examples of such chemicals are Tempil, a pellet or dot form, and Tempilaq, a solid coating form. Tempil and Tempilaq are trademarks of the Tempil Division of Big Three Industrial Gas & Equipment Co., New York City. Another example is Thermomelt, a trademark of Markal Company, Chicago, for liquefying chemicals in pellet, coating, or stick form. Other temperature-indicating chemicals change color upon attaining a design temperature.

By arranging such temperature-indicating chemicals in a scale formation and by indexing the scale in easily readable numerals of degrees of temperature, it is possible to determine the attained temperature of the chemicals merely by glancing at the limit of the change and the scale number indexed thereto. For example, in the clinical temperature range of 96°F to 106°F, assume the attained temperature is 100°F. All chemicals indicating below 100°F will not have changed, yielding a continuous band or area of change abruptly terminating at the 100°F index and a continuous band or area of no change beginning at 100°F. The eyes of the observer are quickly drawn by the bands to the interface or line between the changed and unchanged portions, that location being easily read on the marked index scale.

The formation of chemicals placed on substrate 40 will vary depending upon manufacturing methods and chemicals employed. As shown in the drawing the temperature-indicating chemicals are applied in a series of dots 42, the dots being linearly arranged in correspondence with the temperature scale. The drawing shows a double row of chemical dots but any suitable arrangement may be employed. In place of dots there may be applied a series of parallel lines of chemicals or there may be applied a continuous but changing chemical coating.

Substrate 40 may be paper, flexible plastic or any other suitable carrier for the chemicals. Substrate 40 may be a laminated composition of various materials and may encapsulate the chemicals to protect them from environmental changes but when so encapsulated there should be a transparent overlay to allow the chemicals to remain visible.

Substrate 40 is applied to bifurcated mouthpiece 12 by sliding its edges into grooved flanges 26 and 28 and its central portion under hook 30 and is removed by similar sliding in the opposite direction. The holder is placed under the tongue of the patient in intimate contact with the tissues to provide good heat transfer between the tissues and temperature-indicating chemicals 42. If substrate 40 has an overlay covering chemicals 42, then that overlay should be a good heat transfer medium because it is necessary for rapid temperature measurement that an equilibrium in temperature between the tissues of the mouth and the chemicals be reached quickly. There is no noticeable time lag between the time the chemicals attain the measured temperature and the time they indicate that temperature by change in visible property.

Bifurcated mouthpiece 12, if in close contact with substrate 40, would affect the temperature of the substrate by heat transfer between them. This effect may be minimized by providing a plurality of small raised bosses 32 on arms 14 and 16 inside bifurcated mouthpiece 12. This will materially reduce the surface area of contact between the mouthpiece and the substrate and will correspondingly reduce heat transfer between those two members.

A substrate once used should be disposed of both for hygienic reasons and also for accuracy in temperature measurement.

Handle 20 may be disposed at an angle with respect to the plane of bifurcated mouthpiece 12, this may be seen in FIGS. 3 and 6.

While the foregoing is illustrative of a preferred embodiment, it is clear that other embodiments and modifications may be had. For example, if it is desired to have an extremely low cost holder it is possible to permanently join a semi-rigid substrate 40 to a handle 20. By forming the substrate into the bifurcated configuration necessary for good temperature measurement, it is possible to eliminate a separate mouthpiece. Similarly, it is possible to apply the temperature-indicating chemicals directly to the mouthpiece, the mouthpiece being the substrate.

The concept of a bifurcated mouthpiece is set forth in my co-pending patent application entitled Bifurcated Thermometer Probe identified above. It may briefly be stated, however, that such a configuration places the temperature-sensing member into the pockets on opposite sides of the fraenum of the tongue thereby securing the element against lateral dislodgement, particularly when the mouth is open or the tongue is in motion. Careful contouring of the bifurcated mouthpiece provides far more intimate and uniform contact with the tissues of the mouth with correspondingly greater accuracy of temperature measurement as compared with a single probe such as the common glass-mercury thermometer bulb. The substrate may be formed, for example, such that the top and bottom edges are curved back to the arms while the central part is held away from the arms by bosses 32.

What is claimed is:

1. A chemical thermometer comprising:
   a. a temperature-indicating means; and
   b. a holder for said temperature-indicating means, said holder comprising a bifurcated mouthpiece and a handle therefor ,
   c. said bifurcated mouthpiece comprising a pair of arms joined at an apex to substantially form a V shape,
   d. said bifurcated mouthpiece being provided with retaining means to removably retain said temperature-indicating means.

2. A chemical thermometer in accordance with claim 1, wherein:

said retaining means comprises a grooved flange at the outer portion of each said arm and a hook within said apex.

3. A chemical thermometer in accordance with claim 1, wherein:
said arms are provided with a plurality of raised bosses to reduce the area of surface contact between said bifurcated mouthpiece and said temperature-indicating means.

4. A chemical thermometer in accordance with claim 1, wherein:
said bifurcated mouthpiece is integral with, and forms at least a part of, said temperature indicating means.

5. A chemical thermometer comprising:
a. temperature-indicating means; and
b. a holder for said temperature-indicating means, said holder comprising a bifurcated mouthpiece and a handle therefor,
c. said temperature-indicating means comprising temperature-indicating chemicals which change in visible property upon attaining design temperatures and a substrate for said temperature-indicating chemicals,
d. said temperature-indicating chemicals being disposed on said substrate in scale formation, said substrate being provided with temperature index markings corresponding to said scale.

6. A chemical thermometer comprising:
a. temperature-indicating means; and
b. a holder for said temper temperature-indicating means, said holder comprising a bifurcated mouthpiece and a handle therefor,
c. said temperature-indicating means comprising temperature-indicating chemicals applied to said bifurcated mouthpiece.

* * * * *